Dec. 15, 1925.  
P. SUTHERLAND  
CONVEYER  
Filed Dec. 13, 1924
1,565,760
2 Sheets-Sheet 1
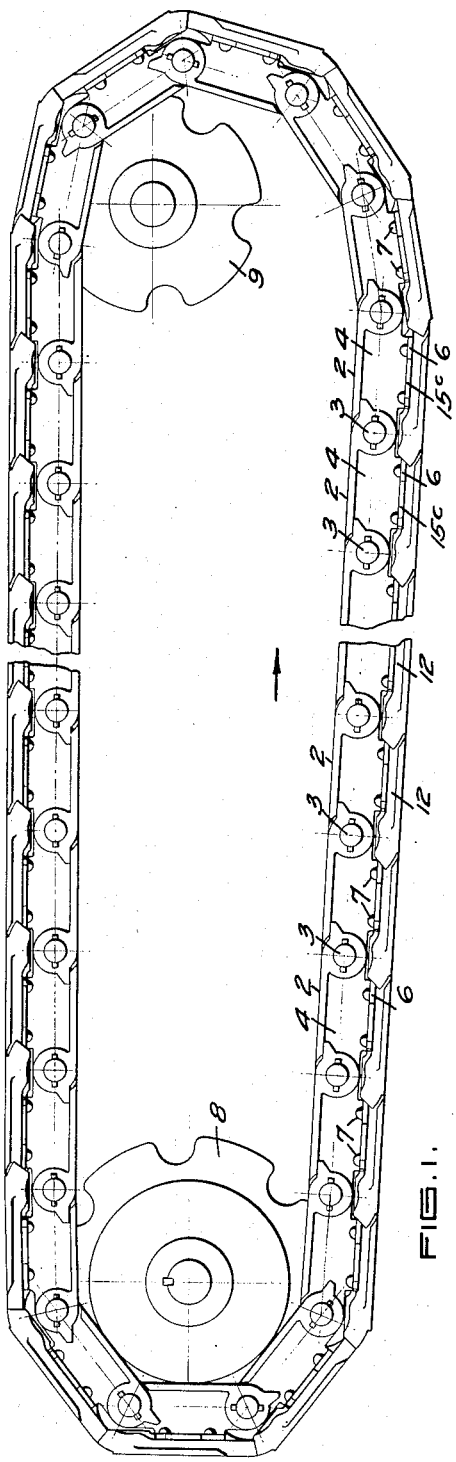
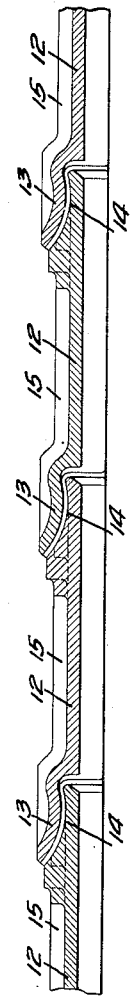
FIG.1.
FIG.2.
INVENTOR  
Paul Sutherland.  
BY White Prost & Evans  
his ATTORNEYS INVENTOR
Paul Sutherland
BY White Prost & Evans
his ATTORNEYS Patented Dec. 15, 1925.

1,565,760

UNITED STATES PATENT OFFICE.

PAUL SUTHERLAND, OF INSPIRATION, ARIZONA, ASSIGNOR TO AMERICAN MANGANESE STEEL COMPANY, OF CHICAGO HEIGHTS, ILLINOIS, A CORPORATION OF MAINE.

CONVEYER.

Application filed December 13, 1924. Serial No. 755,645.

*To all whom it may concern:*

Be it known that I, PAUL SUTHERLAND, a citizen of the United States, and a resident of Inspiration, Gila County, State of Arizona, have invented certain new and useful Conveyers, of which the following is a specification.

The invention relates to conveyers and particularly to platform conveyers and apron conveyers or feeders. Conveyers of this type generally consist of a plurality of heavy metal floor segments mounted on drive chains to form an endless flexible conveyer or apron. These conveyers are employed for conveying and feeding material and are used to a large extent in mining and milling operations in conveying and feeding the ore to devices wherein the ore is subjected to further treatment. These conveyers comprise a plurality of hingedly connected heavy metallic floor segments and, when used for conveying or feeding ore or similar material which contains a percentage of fine particles, these fine particles and some of the larger pieces fall onto and accumulate on the lower run of the conveyer. The conveyer travels over rolls or sprockets arranged at opposite ends of the conveyer and this fine material which falls onto the lower run, accumulates at the point where the lower run moves upwardly over the roller sprocket to the upper run. The accumulation of the material at this point presents many objectionable features, such as cutting out of the sprockets or rollers, packing in the sprockets or rollers or in the chain, and generally interfering with the efficient operation and maintenance of the conveyer.

An object of the present invention is to provide means for causing this material to discharge from the upper surface of the lower run of the conveyer, so that it will not accumulate at the return bend of the conveyer.

Another object of the invention is to provide means on the conveyer for discharging this material over the sides of the conveyer so that it will not accumulate in large amounts at the return bend of the conveyer.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of conveyer embodying my invention, but it is to be understood that I do not limit myself to such form, since the invention, as set forth in the claims, may be embodied in a plurality of forms.

Referring to said drawings:

Figure 1 is a side elevation of an endless conveyer embodying my invention.

Figure 2 is a longitudinal section through a plurality of contiguous floor segments forming part of the lower run of the conveyer, taken on the line 2—2 Figure 3.

Figure 3:
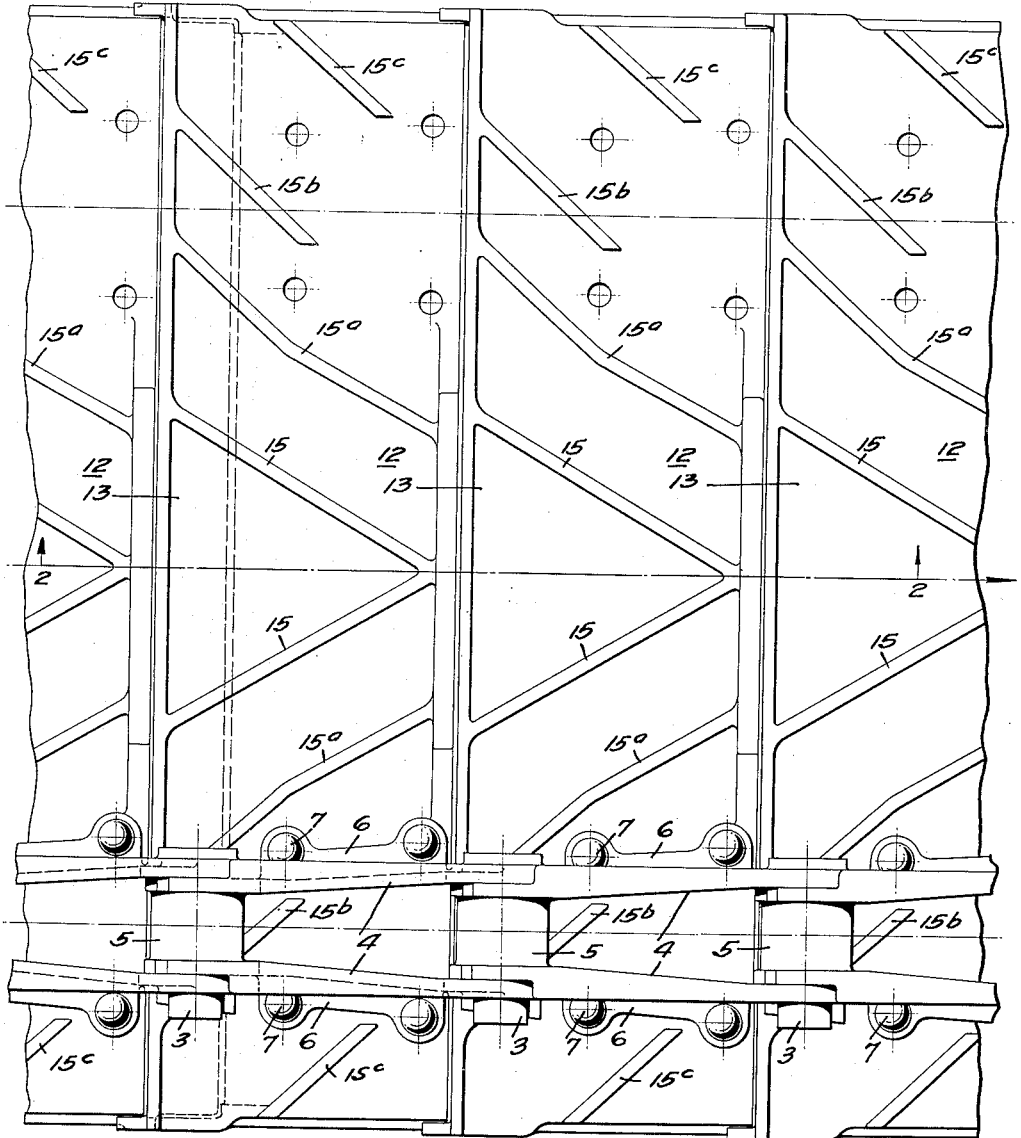
Figure 3 is a plan or top view of a plurality of segments constituting the lower run of the conveyer, one of the drive chains being omitted to show the arrangement of the ribs on the upper surface of the floor segments of the lower run of the conveyer.
Figure 4:
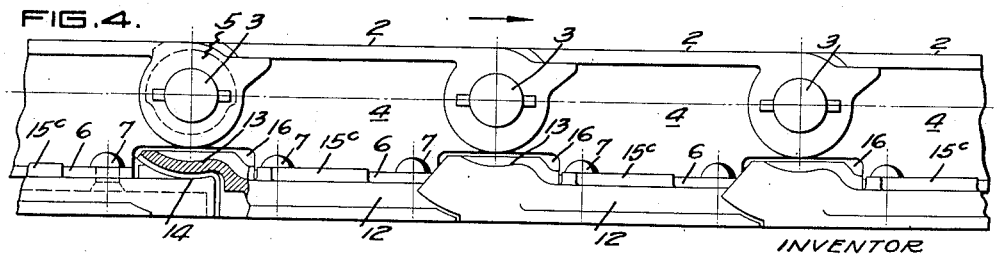
Figure 4 is a side elevation of a portion of the lower run of the conveyer.

It is to be understood that the conveyer on the lower run is inverted on the upper run and that the upper surface of the conveyer on the upper run constitutes the lower surface of the conveyer on the lower run and that the lower surface of the conveyer on the upper run constitutes the upper surface of the conveyer on the lower run. Since the device of my invention is operative to remove the material which gathers on the upper surface of the lower run of the conveyer as the conveyer makes its return bend from the lower run to the upper run, I shall describe such surface as the upper surface of the lower run of the conveyer.

The conveyer shown in the drawings comprises two chains, each composed of a plurality of hingedly connected one-piece integral links 2 hinged together by the pins 3. The links are preferably constructed so that when hinged together, they form a chain flexible in one direction and rigid in the opposite direction, so that the chain may flex to pass over the rollers or sprockets, but will not sag under the load imposed on the upper run of the conveyer. Each link is preferably an integral casting comprising side walls 4 which are connected at one end by the integral barrel 5. The walls 4 diverge from each other as they depart from the barrel 5, so that at the other end of the link, the side walls are spaced apart sufficiently to receive the barrel 5 of the next link between them. The side walls are provided adjacent their ends with transverse apertures, which, when the links are assembled, register with the aperture through the barrel 5 and the pin 3 is passed through the alined apertures to hinge the links together. Each side wall is provided with a flange 6, having apertures therein to receive rivets 7 for attaching the floor segments of the conveyer to the link. The side walls 4 of the link are of less depth at their ends than at that portion at which the flanges 6 occur, so that the links are spaced away from the floor segments at the link hinges.

A conveyer usually comprises two parallel chains which pass over drive sprockets 8 at one end of the run and over idler wheels or sprockets or rollers 9 at the other end of the run. The floor of the conveyer comprises a plurality of overlapping heavy metal floor segments 12, each segment being secured to two transversely alined links in the two chains, by the rivets 7 passing through the ears or flanges 6. An endless flexible floor is thus provided for transporting the load placed thereon. The floor segments are preferably arranged in overlapping relation, so that as they pass over the sprockets or idlers they will not be spread apart to form cracks between the adjacent segments. For this purpose each floor segment is preferably provided at one end with an upwardly curved lip 13, concentric with the axis of the hinge pin 3 and overlying a similarly curved lip 14 on the adjacent end of the next segment, so that as the conveyor is flexed, the lip may move readily without opening a joint between the successive segments.

Some of the material carried by the conveyer falls on to the upper surface of the lower run of the conveyer. As the conveyer moves, this material is carried toward the roller or sprocket 9 and, as the conveyer makes its return bend around the roller or sprocket 9, this material accumulates and banks up on the lower run of the conveyer at the return bend, manifestly interfering with the proper operation of the conveyer. An object of my invention is to provide means for discharging this material as it reaches the return bend of the conveyer, so that it will not accumulate in large amounts and interfere with the operation of the conveyer. This I have accomplished by arranging ribs 15 on the upper surface of the floor segments of the lower run of the conveyer. These ribs, which I have termed spill ribs, are inclined to the longitudinal axis of movement of the conveyer, so that as the segments pass around the return bend, the fine material is directed or forced toward the side edges of the conveyer. Each floor segment 12 is provided on its upper surface with a plurality of these ribs so that the material is successively moved toward the side edges of the conveyer by the successive floor segments. The ribs of the successive segments receive the material from the ribs of the preceding segment and continue the movement of the material toward the side edge. These ribs are arranged so that they direct the material past the chains through the apertures 16 which occur below the hinged connections between the chain links, so that the material which is deposited on the lower run of the conveyer between the chain links, is moved outward under the chain links and is not required to pass over the chains, thereby preventing the accumulation of a large amount of material between the chains. Referring particularly to Figure 3, the material moved transversely by the rib 15 of one floor segment is caught by the rib 15ª of the following floor segment, which passes it into the space between the side walls of the chain, where it is caught by the rib 15ᵇ of the third floor segment and carried through the aperture 16, where it is caught by the rib 15ᶜ of the fourth floor segment, which rib discharges it over the edge of the segment. While this arrangement of the spill ribs is effective in discharging the fine material, it is to be understood that I do not limit myself to this particular arrangement, since any other arrangement for accomplishing the same result may be produced.

I claim:

1. An endless conveyer comprising a plurality of hingedly connected floor segments, the conveyer having a lower run on which material accumulates during the operation of the conveyer and means carried by the conveyer adapted to direct this material over the sides of the conveyer when the conveyer is in operation.

2. An endless conveyer comprising a plurality of hingedly connected floor segments, the conveyer having a lower run on which material accumulates during the operation of the conveyer and means carried by the conveyer operative during the movement thereof for discharging this material from the sides of the conveyer.

3. An endless conveyer comprising a plurality of hingedly connected floor segments, the conveyer having a lower run on which material accumulates during the operation of the conveyer and means on the under surface of the floor segments and carried thereby adapted to discharge this material from the conveyer during the movement thereof.

4. An endless conveyer comprising a plurality of hingedly connected floor segments, the conveyer having a lower run on the upper surface of which material accumulates during the operation of the conveyer and ribs on said surface arranged at an angle to the longitudinal axis of the movement of the conveyer.

5. An endless conveyer comprising a plurality of hingedly connected floor segments, the conveyer having a lower run on the upper surface of which material accumulates during the operation of the conveyer and ribs on said surface arranged to direct said material over the sides of the conveyer during the movement thereof.

6. A conveyer comprising an endless chain composed of a plurality of links hinged together, floor segments secured to the links and spaced therefrom at the hinges, the conveyer having a lower run on the upper surface of which material accumulates during the operation of the conveyer and ribs on said surface arranged to direct this material over the sides of the conveyer when the conveyer is in movement.

7. A conveyer comprising an endless chain composed of a plurality of links hinged together, floor segments secured to the links and spaced therefrom at the hinges, the conveyer having a lower run on the upper surface of which material accumulates during the operation of the conveyer and ribs on said surface arranged to direct this material over the sides of the conveyer when the conveyer is in movement, said ribs being disposed to direct the material past the chain at those places where the segments are spaced from the chain.

8. A conveyer comprising an endless chain composed of a plurality of links hinged together, rollers over which said chain passes at opposite ends of the conveyer, overlapping floor segments secured to the links, the conveyer having a lower run on which material accumulates during the operation of the conveyer and ribs on said segments inclined to the longitudinal axis of movement of the conveyer arranged to cause transverse movement of said material as the segments of the lower run of the conveyer pass upward toward one of said rollers.

In testimony whereof, I have hereunto set my hand.

PAUL SUTHERLAND.